United States Patent
Swallow et al.

(10) Patent No.: US 10,637,775 B2
(45) Date of Patent: Apr. 28, 2020

(54) MAKE-BEFORE-BREAK MECHANISM FOR LABEL SWITCHED PATHS

(71) Applicant: Cisco Technology, Inc., San Jose, CA (US)

(72) Inventors: George Swallow, Boston, MA (US); Tarek Saad, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 14/886,010

(22) Filed: Oct. 17, 2015

(65) Prior Publication Data

US 2017/0111268 A1 Apr. 20, 2017

(51) Int. Cl.
*H04L 12/723* (2013.01)
*H04L 12/741* (2013.01)
*H04L 12/729* (2013.01)
*H04L 12/701* (2013.01)
*H04L 12/707* (2013.01)

(52) U.S. Cl.
CPC .............. *H04L 45/50* (2013.01); *H04L 45/00* (2013.01); *H04L 45/125* (2013.01); *H04L 45/22* (2013.01); *H04L 45/74* (2013.01)

(58) Field of Classification Search
None
See application file for complete search history.

(56) References Cited

U.S. PATENT DOCUMENTS

| 7,702,810 | B1 * | 4/2010 | Pan | H04L 45/00 370/216 |
| 7,760,621 | B2 | 7/2010 | Xiao et al. | |
| 8,014,380 | B2 | 9/2011 | Lewis | |
| 8,416,747 | B2 | 4/2013 | Bai | |
| 8,750,310 | B2 | 6/2014 | Gandhi et al. | |
| 9,178,809 | B1 * | 11/2015 | Shen | H04L 12/4633 |
| 9,219,614 | B2 * | 12/2015 | Zhao | H04L 12/1863 |
| 2006/0036892 | A1 * | 2/2006 | Sunna | H04L 12/4633 714/4.1 |
| 2007/0133568 | A1 * | 6/2007 | Qing | H04L 12/66 370/397 |
| 2008/0062882 | A1 * | 3/2008 | Xiao | H04L 45/00 370/238 |

(Continued)

OTHER PUBLICATIONS

K. Shiomoto "Advice on When it is Safe to Start Sending Data on Label Switched Paths Established Using RSVP-TE" Internet Engineering Task Force (IETF); Sep. 2011; pp. 1-11.

(Continued)

*Primary Examiner* — Jutai Kao
(74) *Attorney, Agent, or Firm* — Behmke Innovation Group LLC; James M. Behmke; Jonathon P. Western

(57) ABSTRACT

In one embodiment, a device in a network determines that traffic sent via a first label switched path should be sent via a new label switched path. The device sends the traffic along the new label switched path using a label stack that indicates one or more adjacency segments or interface binding labels. A particular node along the new label switched path is configured to forward the traffic via a particular interface of the node based on a corresponding interface binding label or adjacency segment indicated by the traffic. The device completes a switchover from the first path to the new path.

14 Claims, 8 Drawing Sheets

(56) References Cited

U.S. PATENT DOCUMENTS

| | | | |
|---|---|---|---|
| 2010/0008373 A1* | 1/2010 | Xiao | H04L 45/507 370/401 |
| 2012/0092986 A1* | 4/2012 | Chen | H04L 45/22 370/228 |
| 2013/0322248 A1* | 12/2013 | Guo | H04L 45/507 370/235 |
| 2014/0010072 A1* | 1/2014 | Gandhi | H04L 47/724 370/228 |
| 2014/0064062 A1 | 3/2014 | Taillon et al. | |
| 2014/0269727 A1 | 9/2014 | Filsfils et al. | |
| 2016/0234106 A1* | 8/2016 | Li | H04L 45/02 |
| 2017/0346720 A1* | 11/2017 | Lazzeri | H04L 45/124 |
| 2018/0034730 A1* | 2/2018 | Zhao | H04L 45/507 |

OTHER PUBLICATIONS

Aggarwal et al. "Bidirectional Forwarding Detection (BFD for MPLS Label Switched Paths (LSPs)" Internet Engineering Task Force (IETF); Jun. 2010; pp. 1-12.

Torvi et al. "LSP Self-Ping draft-bonica-mpls-self-ping-06" MPLS Working Group; May 18, 2015; pp. 1-11.

International Search Report and Written Opinion dated Feb. 8, 2017 in connection with PCT/US2016/056941.

\* cited by examiner

MAKE-BEFORE-BREAK MECHANISM FOR LABEL SWITCHED PATHS

TECHNICAL FIELD

The present disclosure relates generally to computer networks, and, more particularly, to a make-before-break mechanism for label switched paths in a computer network.

BACKGROUND

Multiprotocol label switching (MPLS) is a packet switching technology that allows routing decisions to be based on labels that are prepended to the headers of packets. Such a label represents a path in the network and is used to make forwarding decisions until the corresponding packet reaches its destination. Once the packet reaches its destination, the destination device may "pop" (e.g., remove) the corresponding label from the header of the packet and/or apply another label to the packet, to continue routing the packet throughout the network.

The Resource Reservation Protocol—Traffic Engineering (RSVP-TE) is another networking technology that can be used in various forms of networks, such as MPLS-based networks. More specifically, when used in an MPLS-based network, RSVP-TE provides mechanisms to gather metrics regarding the network (e.g., in terms of bandwidth, jitter, etc.) and, based on the gathered metrics, provide quality of service (QoS) guarantees for certain traffic types by reserving resources. For example, RSVP-TE may be used to reserve network resources for real-time voice and video traffic, to guarantee at least a minimum level of performance. As network conditions can change over time, RSVP-TE also facilitates the reallocation of resources and/or initiation of routing changes in the network (e.g., by switching the traffic to a different network path). Using RSVP-TE, such path/tunnel changes may be made in a make-before-break (MBB) manner, meaning that the new path must be fully established before tearing down the old path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network determines that traffic sent via a first label switched path should be sent via a new label switched path. The device sends the traffic along the new label switched path using a label stack that indicates one or more adjacency segments or interface binding labels. A particular node along the new label switched path is configured to forward the traffic via a particular interface of the node based on a corresponding interface binding label or adjacency segment indicated by the traffic. The device completes a switchover from the first path to the new path.

In further embodiments, a device in a network determines an adjacency segment or an interface binding label for a traffic engineering interface of the device. The device provides the adjacency segment or interface binding label towards a head-end node of a path in the network. The device receives a packet that includes the adjacency segment or interface binding label. The device forwards the packet via the traffic engineering interface of the device or via the adjacency segment.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
FIG. 1 illustrates an example communication network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network 104, such as an illustrative Multi-Protocol Label Switching (MPLS) core network. Data packets 106 (e.g., traffic/messages) may be exchanged among the nodes/devices 200 of the computer network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
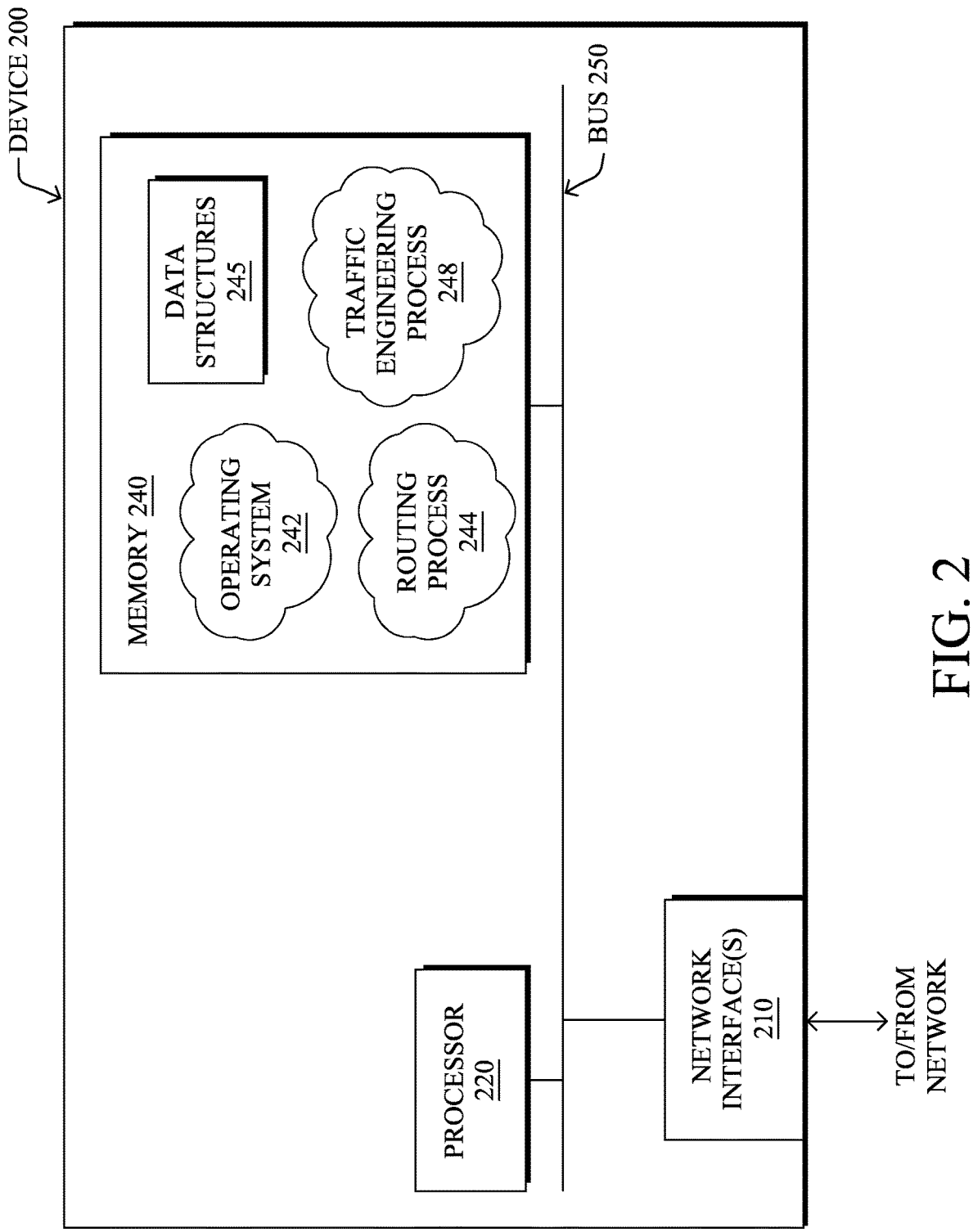
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a traffic engineering (TE) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

TE process/services 248 may operate in conjunction with routing process/services 244 to provide traffic engineering functions within the network. For example, TE process 248 may be configured to collect and/or report on metrics regarding the network (e.g., bandwidth, jitter, etc.), provide quality of service (QoS) functions based on the network metrics, differentiated services, and bandwidth engineering capabilities, etc. In some embodiments, TE process 248 may implement the Resource Reservation Protocol (RSVP) and, more particularly, to the traffic engineering extension to RSVP, RSVP-TE.

In some embodiments, TE process 248 may be further configured to support fast reroute (FRR) capabilities in the network. Generally, FRR is a mechanism that allows a network to adapt quickly to a link or node failure. In particular, FRR allows a network node, referred to as a point of local repair, to detect a routing failure and quickly adapt routing decisions to avoid the point of failure in the network. Routing failures may fall under one of two categories: link failures and node failures. In general, link and node failures differ in that other links may still be available to a given node if one of the links to the node fails, whereas no links to the node would be available if the node itself fails.

A key function of traffic engineering is the ability to modify and optimize the placement of label switched paths (LSPs) in the network, in response to changes in the network. For example, TE process 248 may be operable to alter the LSPs in the network in the event of a failure (e.g., a node or link failure) and/or to due varying input traffic demands (e.g., to change resource reservations due to congestion along the current path).

As noted previously, the process of modifying LSP path placement using RSVP-TE is typically done in a make-before-break (MBB) fashion, to avoid impacting traffic carried over the LSPs. Such a switchover may proceed as follows. First, the head-end device/label edge router (LER) may compute a new and optimal LSP, in response to a network event that necessitates a path change. In turn, the device/LER may notify the nodes along the new LSP of the change, to reserve resources for the new LSP. For example, the head-end device/LER may send an RSVP-TE PATH message along the path, to reserve resources for the new LSP. In response, the nodes may return an RSVP-TE RESV message, to confirm the resource reservations.

Once resources have been reserved for a new LSP, the head-end device/LER may still wait a period of time before sending traffic via the new LSP. In particular, even though resources may be presumed to be reserved for the new path after the head-end device receives a RESV message, it may take some additional time to program the nodes with the path labels for the new LSP. To account for this delay, the head-end device/LER typically delays completion of the switchover to the new LSP for a period of time. Depending on the scale of the network, this delay can be on the order of up to tens of seconds.

While delaying a path switchover affords the nodes along the new path sufficient time to install the new path labels for the path, this delay also means that the traffic will continue to flow on the current path in the meantime. In many situations, such a delay can negatively affect the traffic and/or operations of the network. For example, assume that the path switchover is initiated by the TE mechanism due to resource contention along the current path (e.g., due to degraded link capacity, resource preemption by another LSP, etc.). In such a case, the traffic will continue to experience traffic congestion and/or be dropped until the switchover to the new LSP is completed. In another example, consider the case in which the path switchover is prompted by a failure along the current path. Even if an FRR backup path is used in the meantime to protect the traffic, the traffic may still contend with other traffic traversing the same links and may encounter congestion and/or be dropped while waiting for the switchover to the new LSP to complete.

Make-Before-Break Mechanism for Label Switched Paths

The techniques herein provide for the use of labels that are pre-installed locally at the nodes along a new LSP, to facilitate switchover from the current LSP to the new LSP. In some aspects, these labels may be TE interface binding labels that can be signaled back to the path head-end when reserving resources for the new path. For example, an interface binding label for a device may represent the interface traversed by the RSVP-TE path. During a path switchover, the head-end device can use these labels to begin forwarding traffic along the new path, without having to wait for the path labels for the new LSP to be installed at the nodes along the path. This greatly reduces possible traffic congestion along the old path during the wait time before switchover to the new LSP is complete. In another aspect, the techniques herein may be adapted for use in segment routed networks. Notably, in some cases, the pre-installed labels may be adjacency segments that may be known by the ingress device via the IGP protocol and, hence, can be used immediately to begin forwarding traffic along the new path, once resources have been reserved along the new path.

Specifically, according to one or more embodiments of the disclosure as described in detail below, a device in a network determines that traffic sent via a first label switched path should be sent via a new label switched path. The device sends the traffic along the new label switched path using a label stack that includes the one or more adjacency segments or interface binding labels. A particular node along the new label switched path is configured to forward the traffic via a particular interface of the node based on a corresponding interface binding label or adjacency segment indicated by the traffic. The device completes a switchover from the first path to the new path.

Illustratively, the techniques described herein may be performed by hardware, software, and/or firmware, such as in accordance with processes 244 and 248, which may include computer executable instructions executed by the processor 220 (or independent processor of interfaces 210) to perform functions relating to the techniques described herein. For example, the techniques herein may be treated as extensions to conventional protocols, and as such, may be processed by similar components understood in the art that execute those protocols, accordingly.

Operationally, a node/device along a path in a network, e.g., a label switched router (LSR) may maintain a TE interface binding label (TEIBL) as a local label that is bound to the specific TE interface used by the device. In various embodiments, the node/device may use the TEIBL as a forwarding entry such that if the top label of an incoming MPLS packet to the device matches the TEIBL, the device may pop the interface binding label from the packet and forward the packet via the corresponding TE interface. In various embodiments, these TEIBLs may be used by the head-end device to begin forwarding traffic along a new path in the interim until the nodes along the path are programmed with the path labels for the new path.

Figure 3A:
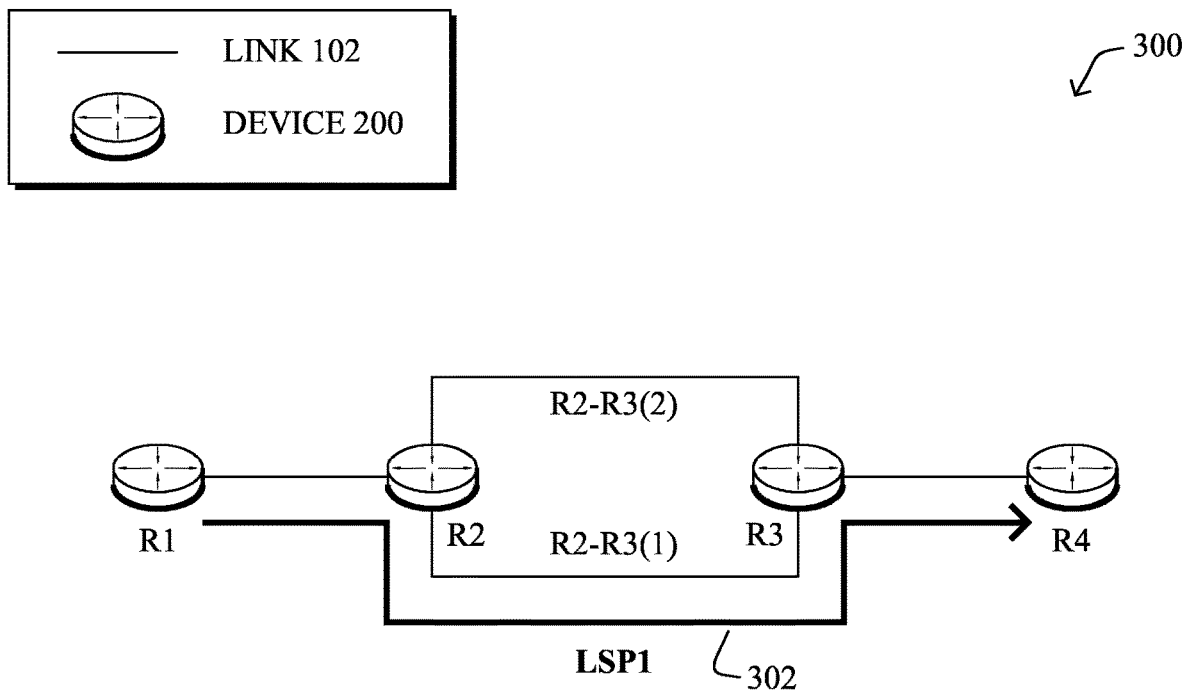
FIGS. 3A-3G illustrate examples of traffic engineering (TE) interface binding labels being signaled in a network.

Referring now to FIGS. 3A-3G, examples are shown of TEIBLs being signaled in a network 300, according to various embodiments. As shown in FIG. 3A, assume that a first tunnel, LSP 302, already exists in network 300 and passes through routers R1-R4. Thus, LSP 302 may include the set of links {R1-R2, R2-R3(1), R3-R4}, which includes the link R2-R3(1) that connects routers R2 and R3. The head-end device, R1, may use LSP 302 to route certain traffic (e.g., traffic matching a forwarding equivalency class associated with LSP 302) through network 300.

Figure 3B:
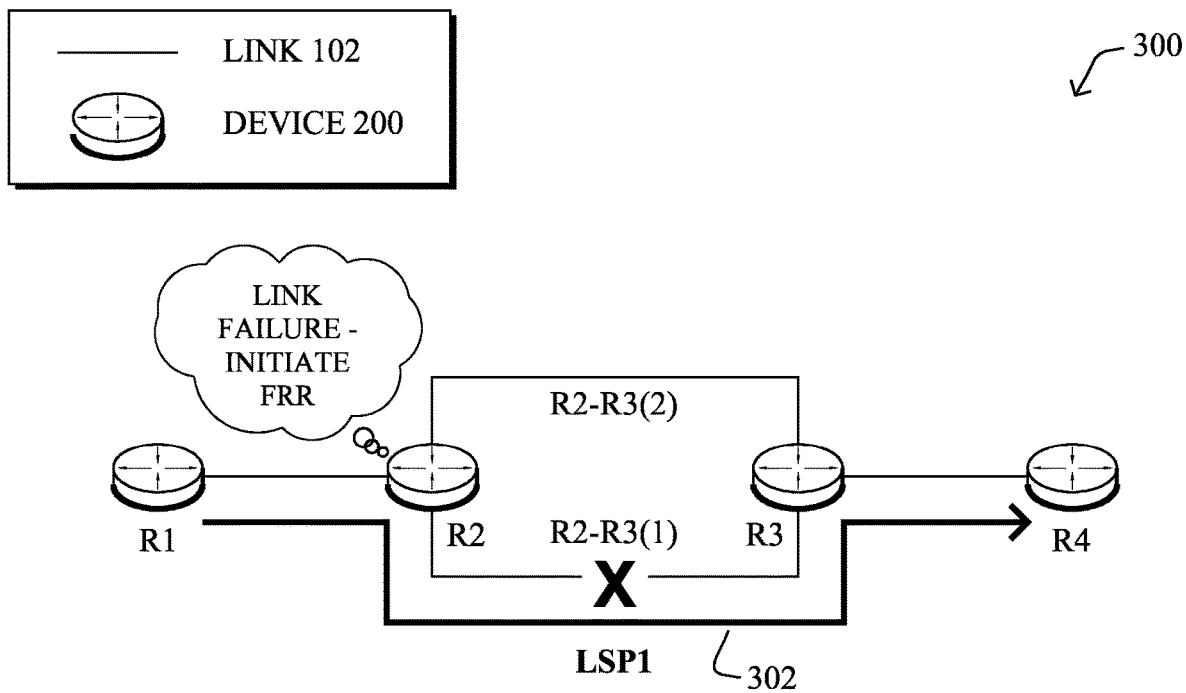

For purposes of illustration, assume that at some point in time after traffic is sent via LSP 302, the head-end or other supervisory device in the network determines that a path switchover should be initiated from LSP 302. For example, as shown in FIG. 3B, assume that a failure occurs in link R2-R3(1) of LSP 302, necessitating a switchover to a new LSP. In such cases, R2 may detect the link failure and alert the head-end of LSP 302 as to the failure. At this time, R2 may also initiate a FRR action, to protect the traffic still being sent along LSP 302. For example, R2 may reroute the traffic along a backup path determined by the FRR mechanism of the router, to ensure continued delivery of the traffic being sent along LSP 302.

Figure 3C:
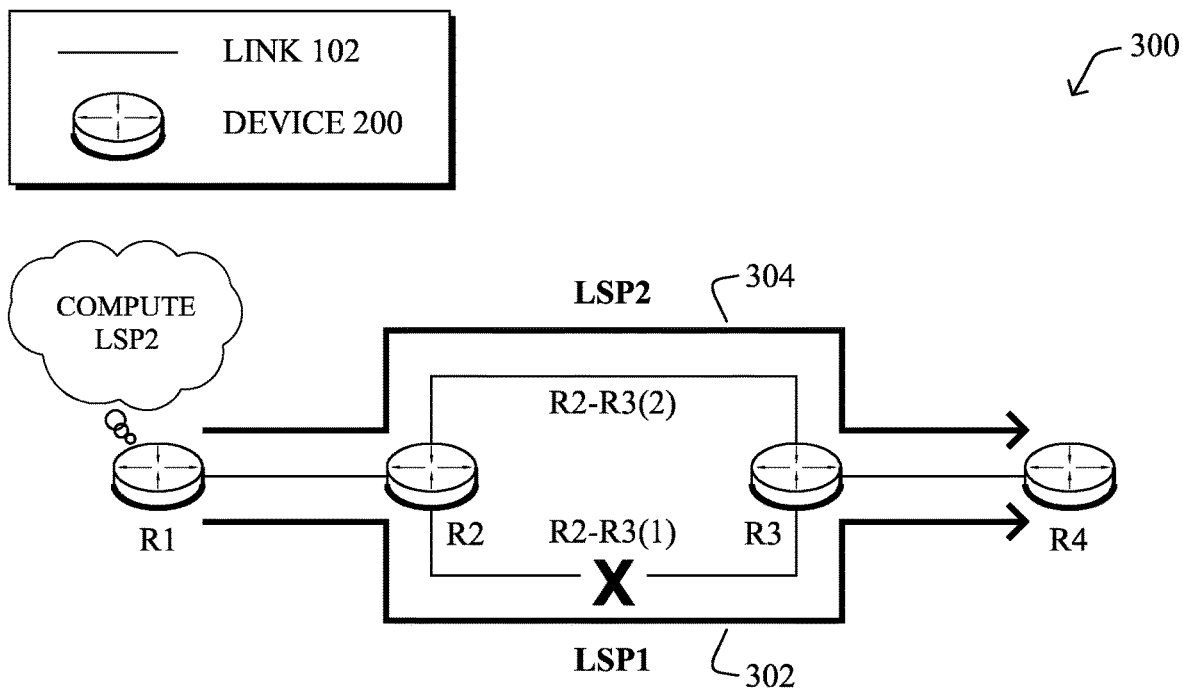

In response to learning of the failure of link R2-R3(1), the head-end node/device may compute a new LSP to replace LSP 302. For example, as shown in FIG. 3C, router R1 may compute a new tunnel, LSP 304, to replace LSP 302. As shown, LSP 304 may comprise the set of links {R1-R2, R2-R3(2), R3-R4}, which includes a different link between R2 and R3, link R2-R3(2).

Figure 3D:
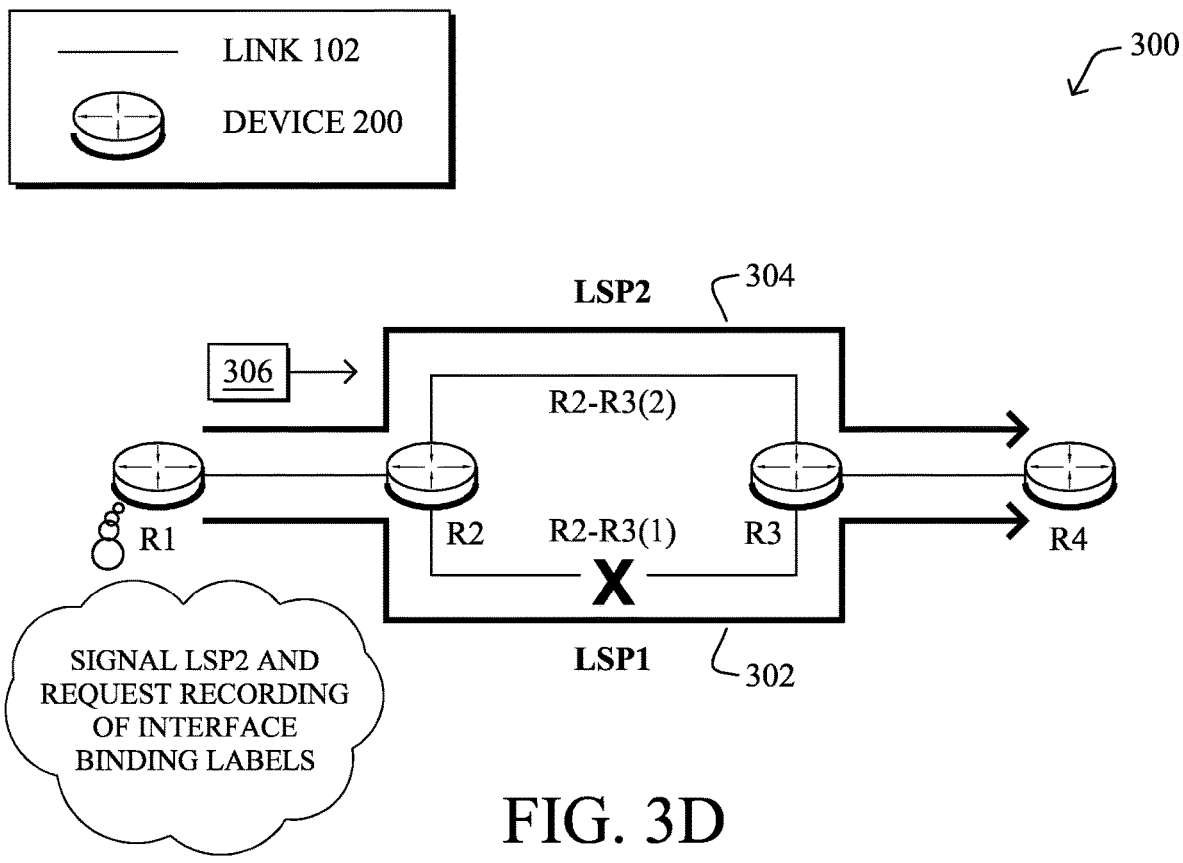

To reserve resources for the new LSP, the head-end device may send a resource reservation request to the nodes along the path. For example, as shown in FIG. 3D, R1 may send a reservation message 306 to nodes R2-R4, to reserve resources for LSP 304. In various embodiments, message 306 may also be configured to request the corresponding TEIBLs from the nodes along the new path. For example, message 306 may be an RSVP-TE PATH message that has been modified to include a custom TEIBL request flag set in the LSP_ATTRIBUTES object of the message. When set, such a flag may signal to the nodes that the head-end is requesting the corresponding TEIBLs for the new path (e.g., the label for the TE interface for the next hop of a particular node along the path).

Figure 3E:
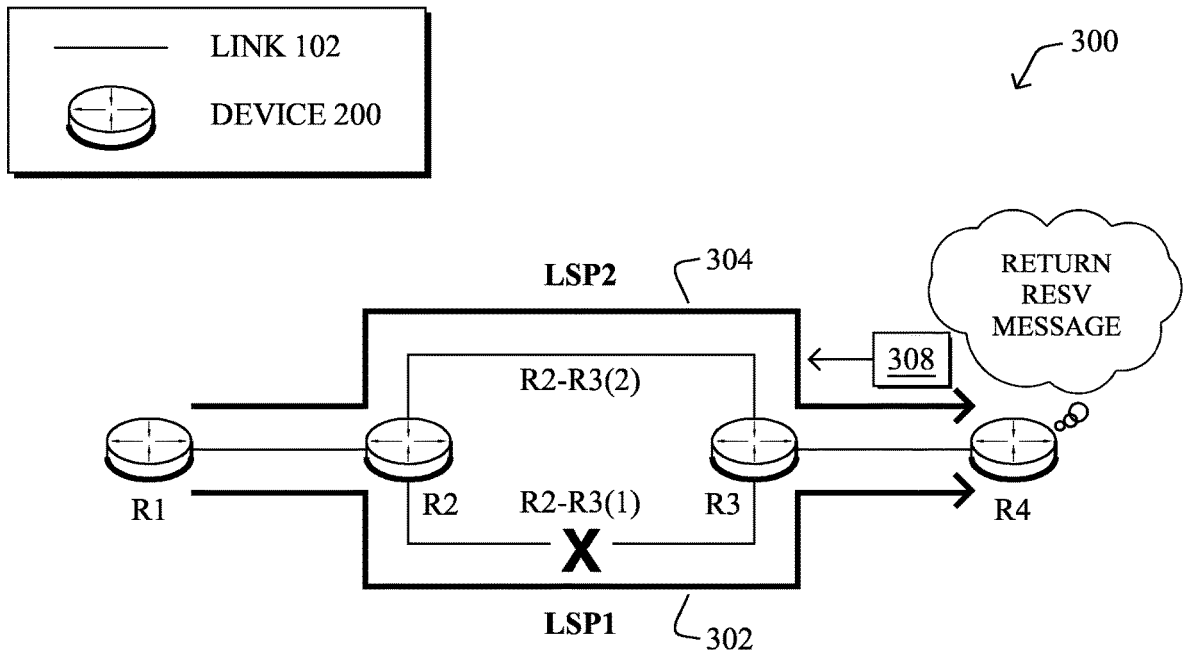

In response to receiving a resource reservation request, the nodes along the new path may reserve the requested resources for LSP 304 and propagate a reservation confirmation message back to the head-end device. For example, as shown in FIG. 3E, node R4 may send a message 308 back towards the head-end device, R1. Such a message may, in one embodiment, be an RSVP-TE RESV message sent upstream towards the head-end device R1 that includes the allocated local label for LSP 304. For example, message 308 sent by R4 may include the path label "LSP2_L4," message 308 sent by R3 may include the path label "LSP2_L3," etc.

Figure 3F:
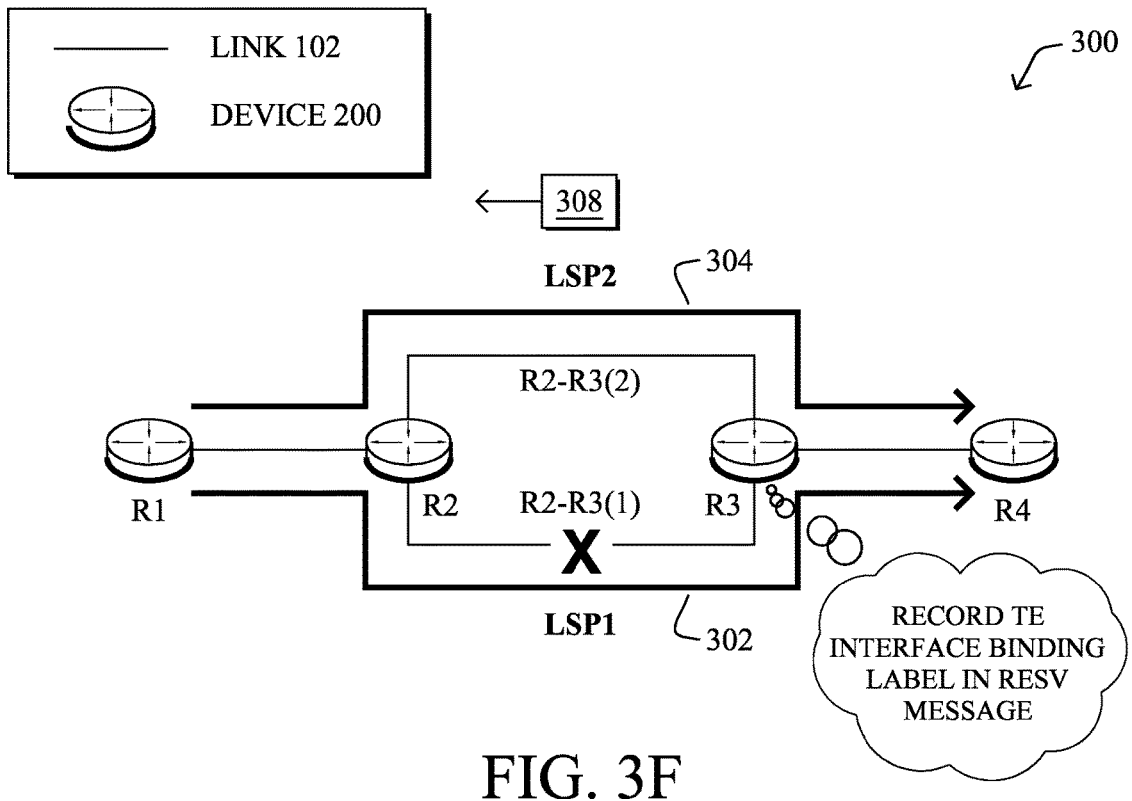

In various embodiments, the nodes along the new path may also include their corresponding TEIBLs in the message propagated towards the head-end device. For example, as shown in FIG. 3F, router R3 may include in message 308 path label "LSP2_L3" for LSP 304, as well as a TEIBL, "TEBL3," that corresponds to the TE interface for link R3-R4. In one embodiment, if message 308 is an RSVP-TE RESV message, next hop TEIBLs may be added to the Record Route Object (RRO) of the message.

Figure 3G:
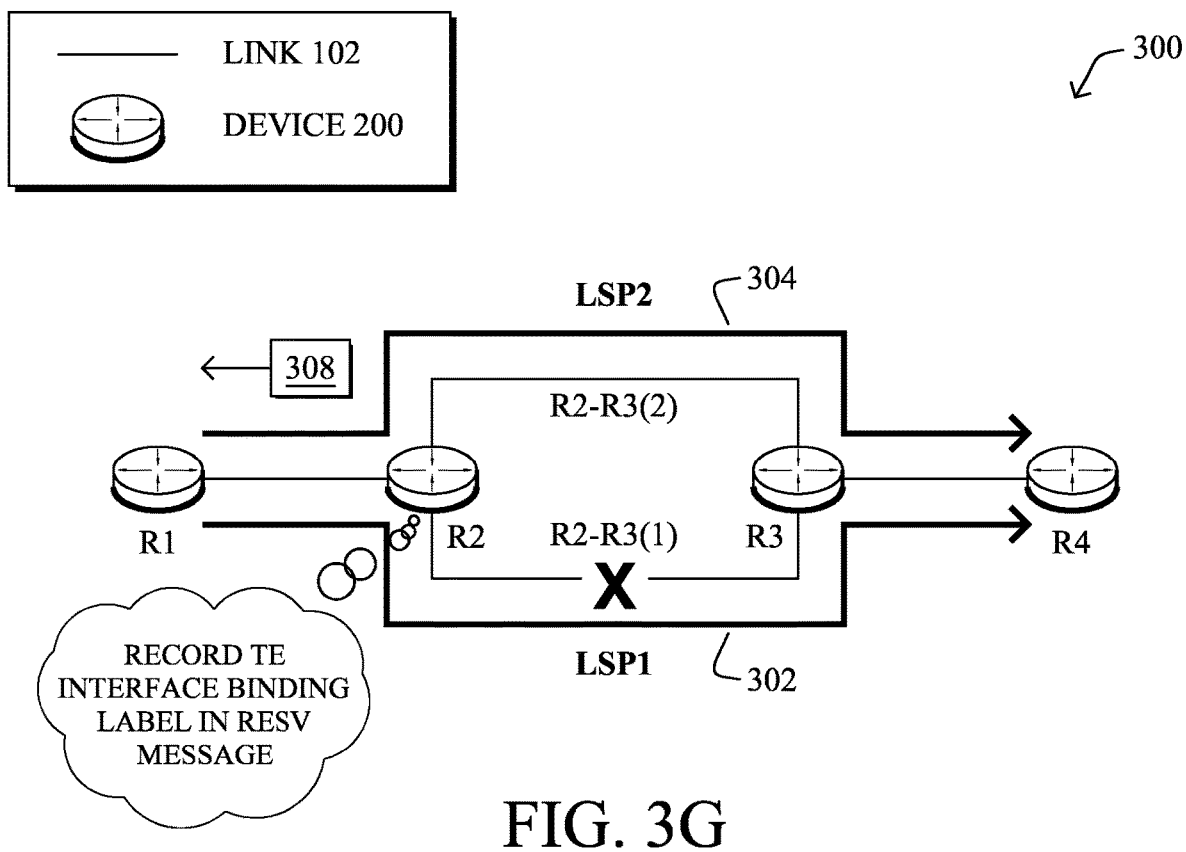

The recordation of TEIBLs may continue on upstream until reaching the head-end device. For example, as shown in FIG. 3G, R2 may add the path label "LSP2_L2" to message 308, as well as its own TEIBL, "TEIBL2.2," to represent the TE interface for link R2-R3(2). Thus, message 308 propagated upstream by R2 may include the following TEIBLs: "TEIBL2.2" and "TEIBL3" which represent the TE interfaces for links R2-R3(2) and R3-R4, respectively. In this way, the head-end device may receive data indicative of the interface binding labels for the TE interfaces of nodes along new LSP 304. Notably, the set of TEIBLs, {TEIBL3, TEIBL2.2, TEIBL1}, may represent the corresponding links R1-R2, R2-R3(2), and R3-R4, respectively.

Figure 4A:
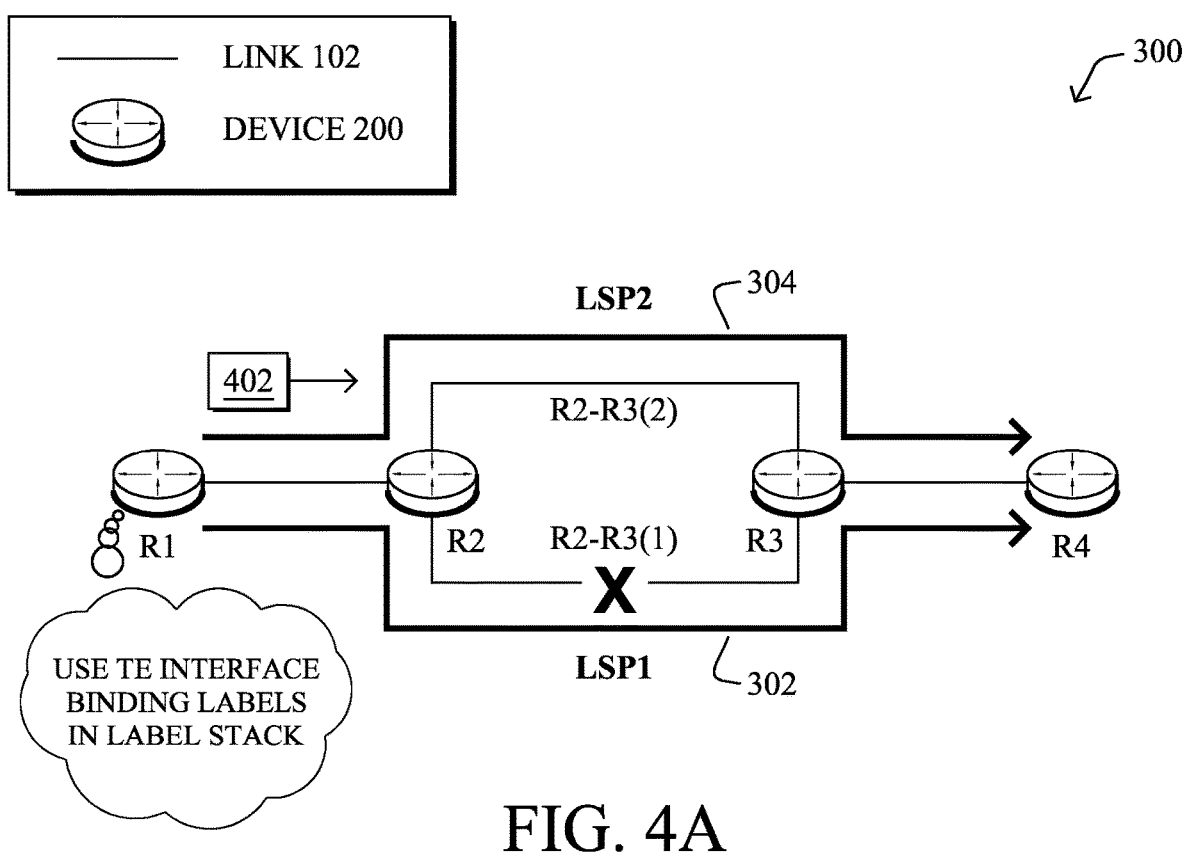
FIGS. 4A-4C illustrate examples of a path switchover in a network.
Figure 4B:
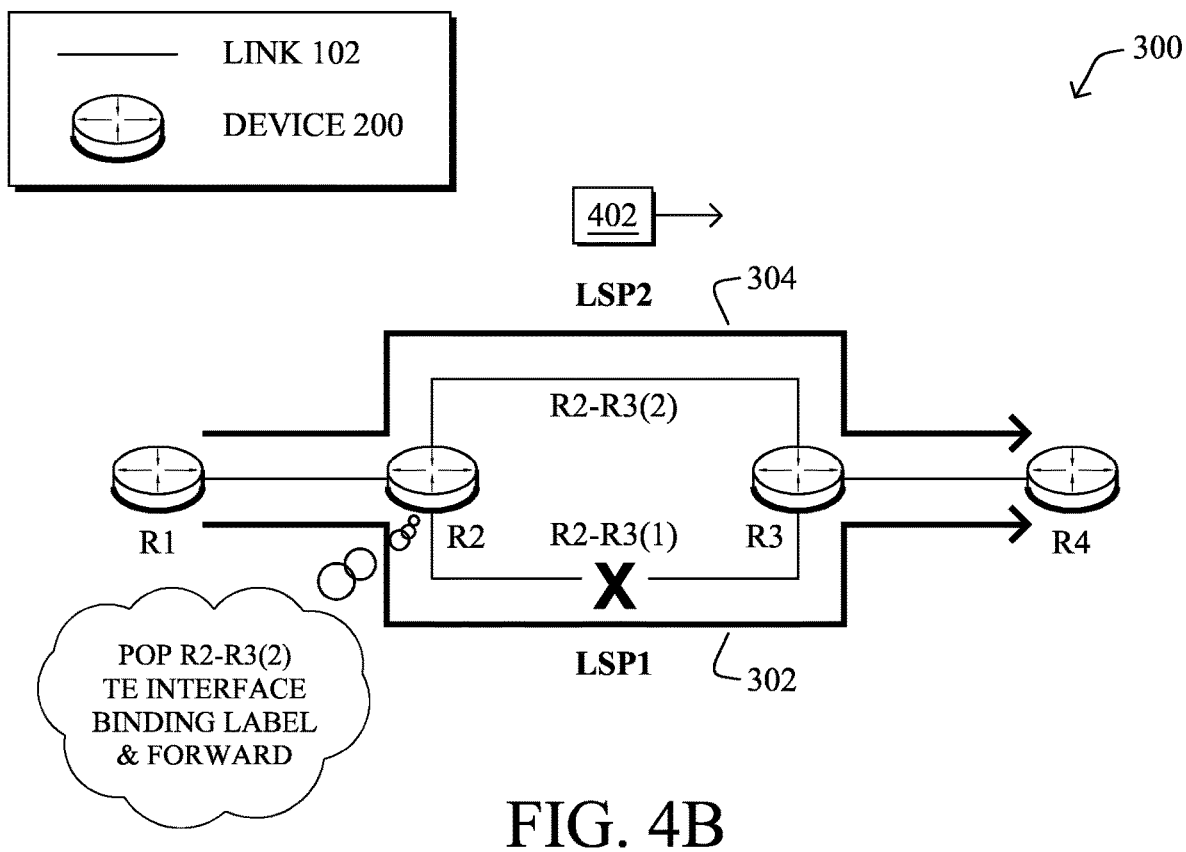
Figure 4C:
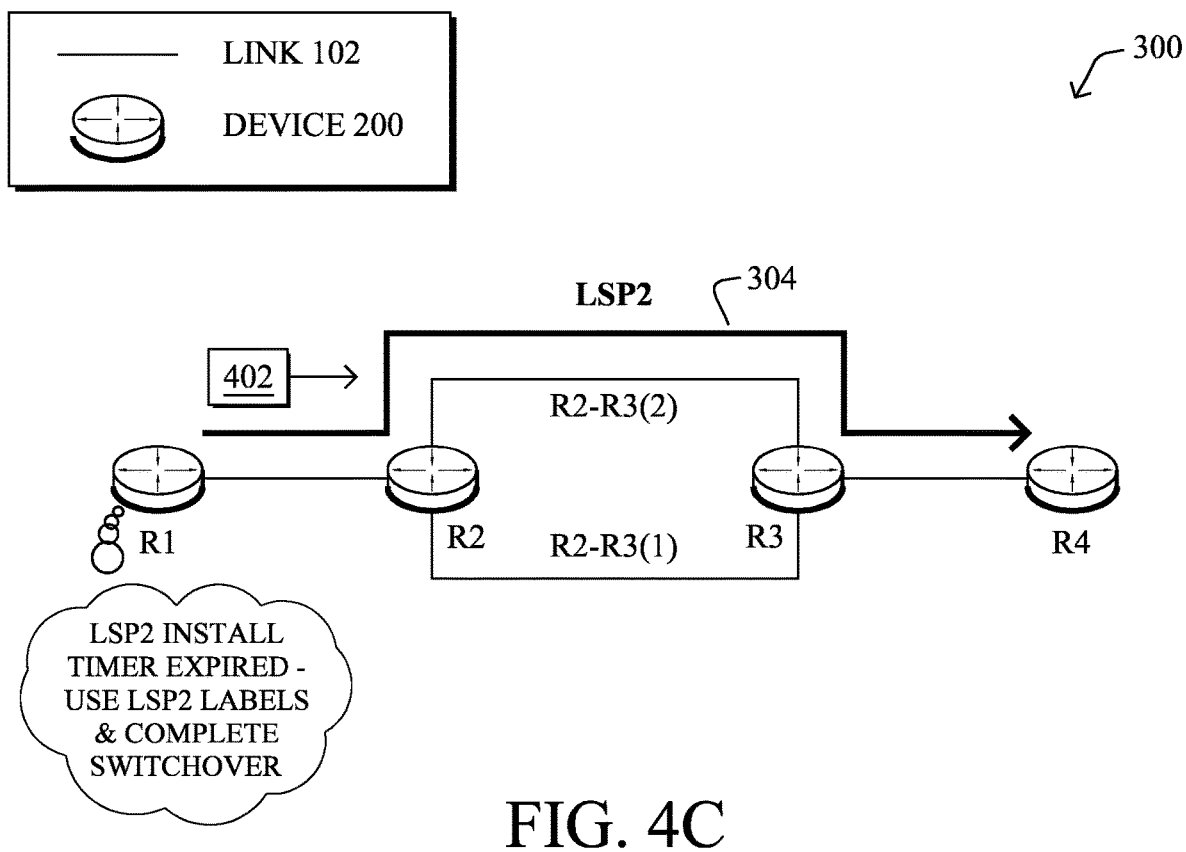

Referring now to FIGS. 4A-4C, examples are shown of a path switchover being performed in network 300. In various embodiments, the head-end device of the new LSP may use the preprogrammed TEIBLs received from the path nodes to avoid the wait time otherwise needed to program the path labels of the new LSP on the transit LSRs. For example, as shown in FIG. 4A, R1 may begin forwarding traffic 402 along LSP 304 that was previously being sent via LSP 302 using the collected TEIBLs. For example, once R1 receives the RSVP RESV message 308 that confirms that the resources for LSP 304 are reserved, R1 may use the TEIBLs indicated in the RRO of message 308 to form an MPLS label stack to begin sending traffic 402 via LSP 304.

In response to receiving a packet that includes a TEIBL at the top of its label stack, a network node may be configured to forward the packet according to the TEIBL. For example, as shown in FIG. 4B, assume that a packet of traffic 402 includes the label, "TEIBL2.2" that corresponds to the TE interface for link R2-R3(2). In such a case, R2 may pop this label from the top of the stack and forward the packet on its TE bound interface, thereby forwarding the packet along LSP 304. Each node along the new path may treat the packets in a similar manner.

At some point in time after sending the traffic using the TEIBL(s), the path labels for the new LSP may be fully programmed into the nodes along the new path. At such a time, the head-end device may begin using a path label for the new LSP instead of the TEIBL(s), to forward the traffic along the new LSP. In some embodiments, the head-end device may do so after expiration of a timer, to ensure that the path labels are installed at the path nodes, prior to using the path labels to forward the traffic along the new path. This timer may start, e.g., when the head-end receives the RESV message including the TEIBL data, when the head-end begins inserting a TEIBL into a label stack, etc. For example, as shown in FIG. 4C, assume that the following path labels are now programmed for LSP 304: {LSP2_L3, LSP2_L2, LSP2_L1}. In such a case, R1 may begin switching traffic 402 on LSP 304 using the downstream allocated path label, "LSP2_L2," thereby completing the switchover.

According to further embodiments, the above techniques may be adapted for use in networks that use segment routing. Briefly, segment routing may be enabled in a network through the use of IGP extensions that allow IGP messages to carry label information. Segments in a segment routed network may fall into one of two categories: node segments and adjacency segments. Adjacency segments generally represent the local interface between a given node and an adjacent neighbor. Notably, adjacency segments do not need to be unique among the different nodes, as adjacency segments only require local significance to the particular node. Node segments, in contrast, are global in nature and use unique identifiers to represent node segment endpoints. When used in conjunction with MPLS, segments (e.g., node and adjacency segments) may be treated as labels, whereby a node may either "push" a new segment/label onto the stack, "pop" (e.g., remove) the top segment/label from the stack, or "swap" the top label of the stack with another label.

Assume, for example, that a device in a segment routed network determines that a path switchover should occur (e.g., due to a failure along the current path, due to changing resource requirements, etc.). In some embodiments, the device may maintain a local database that includes the adjacency segments used by the nodes along the new path. In such cases, the device may alternatively use these adjacency segments to immediately begin constructing label stacks for the new path, without having to request or receive TEIBLs from the nodes along the new path. In turn, if a node along the new path receives a packet that indicates a local adjacency segment, the node may pop the adjacency segment from the stack and forward the packet along the corresponding interface to the next hop along the new path.

Figure 5:
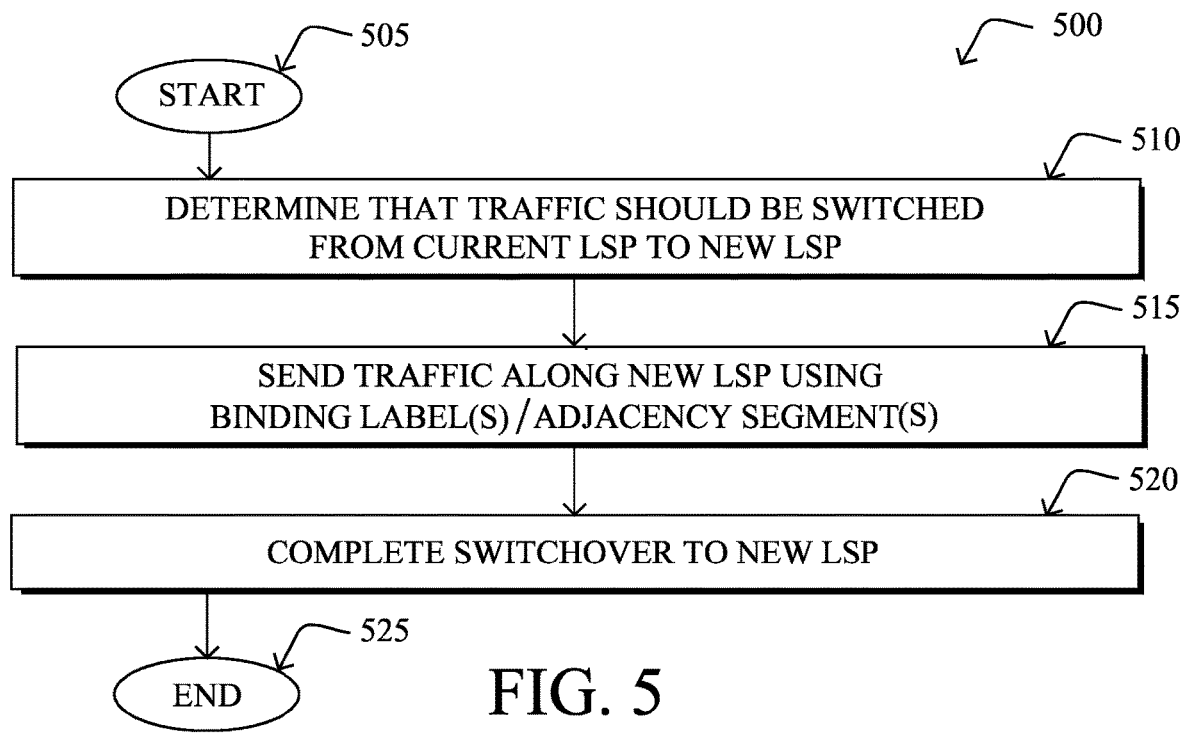
FIG. 5 illustrates an example simplified procedure for performing a path switchover in a network.

FIG. 5 illustrates an example simplified procedure for performing an LSP switchover in a network, in accordance with the embodiments herein. In general, procedure 500 may be performed by a node/device (e.g., device 200) by executing machine instructions (e.g., processes 244, 248). For example, procedure 500 may be performed by a head-end device/LER of an LSP via which traffic is routed in the network. The procedure 500 may begin at step 505 and continues on to step 510 where, as described in greater detail above, the device may determine that traffic sent along the current LSP should be switched over to a new LSP. For example, the device may determine that a change in the network (e.g., a link or node failure, an increase in congestion, etc.) necessitates replacing the current LSP with a new, optimized LSP.

At step 515, the device may send traffic along the new LSP using a label stack indicative of one or more of the interface binding labels and/or adjacency segments, as described in greater detail above. In particular, the device may insert a particular TE interface binding label into the label stack of a packet of the traffic. In turn, when a node along the new path receives the packet with the interface binding label at the top of its label stack, the node may be configured to pop this label from the stack and forward the packet via the corresponding TE interface. In the case in which the device already has access to the adjacency segment(s) used along the new path, the device may alternatively use these adjacency segment(s) instead of the TEIBL(s) and/or in addition thereto.

The device may receive the interface binding label(s) and/or adjacency segments in any number of different ways. In some embodiments, the device may receive the one or more interface binding labels from nodes along the new LSP as part of the resource reservation process for the new path. Such interface binding labels may represent the local labels used by the nodes for their corresponding TE interfaces along the path. In one embodiment, the device may receive the interface binding labels via an RSVP-TE RESV message returned to the device after sending a PATH message to the nodes (e.g., to inform the nodes of the path change, reserve resources for the new path, and request the interface binding labels from the nodes). For example, the RESV message may include the TE interface binding labels in the RRO of the message.

In further embodiments, the device may receive one or more locally installed adjacency segments used by the nodes along the new path. For example, the device may receive data regarding the one more adjacency segments via IGP message(s) and maintain a local database of the adjacency segments. As would be appreciated, the device may receive adjacency segment information from the nodes at any time, either before, during, or after step 510. Notably, in some cases, the device may receive the interface binding and/or adjacency segment labels well in advance of determining that a path switchover should occur. For example, the device may receive adjacency segment information via IGP messaging and store this information in a local database, in anticipation of facilitating a path switchover at a later time.

At step 520, as described in greater detail above, the device may complete the switchover to the new LSP. For example, after a certain amount of time has passed (e.g., after expiration of a timer), the device may begin using the path labels for the new LSP in the label stacks of the traffic instead of the TE interface binding labels. This amount of time may be set to afford the nodes along the path sufficient time to install the path labels for the new LSP. In some cases, the device may also cause the previous LSP to be removed, after switching the traffic over to the new LSP, either after the device begins using the path labels for the new LSP or after the device beings using the TE interface binding labels for the new LSP. Procedure 500 then ends at step 525.

Figure 6:
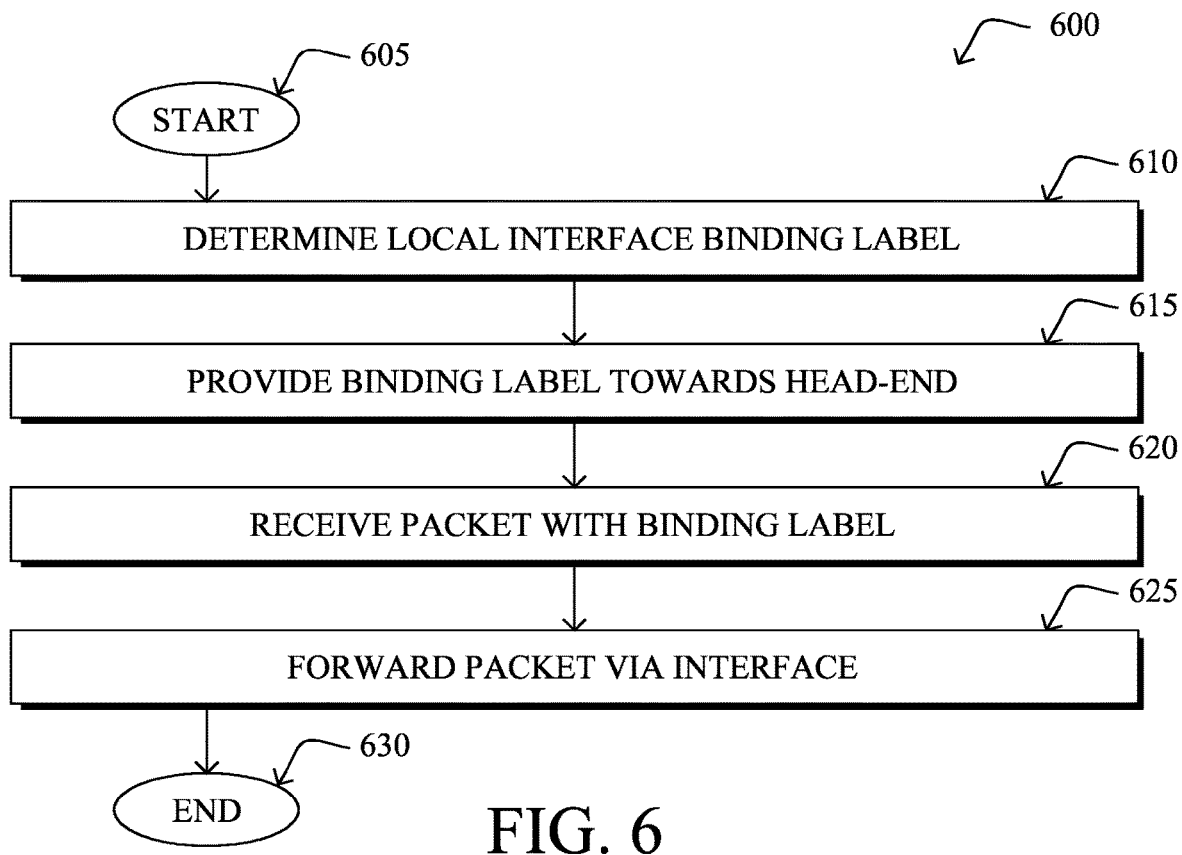
FIG. 6 illustrates an example simplified procedure for forwarding a packet in a network.

Referring now to FIG. 6, an example simplified procedure for forwarding a packet in a network is shown, in accordance with the embodiments herein. Generally, procedure 600 may be performed by a node/device (e.g., node/device 200) located along a network path by executing stored instructions (e.g., processes 244, 248). The procedure 600 may begin at step 605 and continue on to step 610 where, as described in greater detail above, the device may determine a local interface binding label. In various embodiments, such a label may be a locally-used label that represents a TE interface of the device. In further embodiments, the device may determine an adjacency segment, if segment routing is used in the network.

At step 615, as detailed above, the device may provide the interface binding label towards a head-end of an LSP. In one embodiment, the device may provide the interface binding label in response to receiving a notification from the head-end node regarding establishment of a new LSP headed by the head-end node. For example, the device may receive a notification of the new path as part of a resource reservation message (e.g., an RSVP-TE PATH message, etc.) that also requests the TE interface binding label used by the device. In turn, the device may provide the requested binding label back towards the head-end by including the label in a resource reservation response message (e.g., in the RRO of an RSVP-TE RESV message, etc.). Alternatively, the device may provide an adjacency segment towards the head-end, such as via segment routing signaling.

At step 620, the device may receive a packet that includes the TE interface binding label, as described in greater detail above. If, for example, the TE interface binding label is at the top of the MPLS label stack of the packet, the device may "pop" the label from the stack (e.g., remove the label from the packet) and determine that the label should be forwarded via the local TE interface represented by the label. In various embodiments, such an interface binding label may be used by a head-end node of a new LSP, to begin forwarding traffic along the new LSP without having to wait for the nodes along the new path to be programmed with the path labels for the new LSP. Alternatively, if an adjacency segment is pre-existing on the node, the head-end may instead include the adjacency segment label in the stack of the packet.

At step 625, as detailed above, the device may forward the packet via the TE interface indicated by the interface binding label included in the packet. Alternatively, if the packet includes an adjacency segment label, the device may forward the packet via the corresponding link to the next hop along the new path. Thus, the device may be able to forward the packet along the new LSP, even before the device has been fully programmed with the path labels for the LSP. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, allow a head-end device/LER in a label switched network to immediate switch to using a new LSP upon receiving a resource reservation confirmation message for the new LSP. Thus, the device no longer needs to wait a period of time before using the LSP due to the delay in programming in the path labels at the nodes along the new path. This greatly reduces the amount of time that the traffic would otherwise be exposed to a potential congestion or drop condition, such as when an FRR mechanism reroutes the traffic along a backup/bypass path. Similarly, if the path switchover is initiated due to congestion along the current LSP (e.g., due to degraded link capacity, preemption by a higher priority LSP, etc.), the amount of time that the traffic is exposed to this congestion may be greatly reduced by switching the traffic to a new, more optimized LSP sooner.

While there have been shown and described illustrative embodiments that provide for the switchover of traffic from one LSP to another, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a device in a network, that traffic sent via a first label switched path should be sent via a new label switched path;
   sending, by the device, a request for an interface binding label for each node in the new label switched path via a RECORD ROUTE object of a Resource Reservation Protocol (RSVP) PATH message;
   receiving, at the device, the interface binding label for each node in the new label switched path via a Resource Reservation Protocol (RSVP) RESV message, wherein the interface binding label for each node in the new label switched path is recorded in a RECORD ROUTE object (RRO) of the RSVP RESV message to create a label stack for the new label switch path;
   sending, by the device, the traffic along the new label switched path using a label stack that indicates one or more preprogrammed interface binding labels, wherein the one or more interface binding labels are local labels that are each bound to a specific RSVP Traffic Engineering (TE) interface of one or more corresponding nodes along the new label switched path, and a particular node along the new label switched path is configured to forward the traffic via a particular TE interface of the node based on a corresponding interface binding label; and completing, by the device, a switchover from the first path to the new label switched path.

2. The method as in claim 1, further comprising:
requesting, by the device, the one or more interface binding labels for traffic engineering interfaces of the nodes via an RSVP PATH message.

3. The method as in claim 2, wherein the device receives the one or more interface binding labels for the traffic engineering interfaces of the nodes via an RSVP RESV message.

4. The method as in claim 1, wherein the device sends the traffic along the new label switched path using the label corresponding to the new label switched path after expiration of a timer configured to afford the nodes time to install a path label.

5. The method as in claim 1, further comprising:
receiving, at the device, data indicative of the interface binding labels for the traffic engineering interfaces of the nodes along the new label switched path.

6. A method, comprising:
determining, by a device in a network, an interface binding label for a traffic engineering interface of the device, wherein the interface binding label is pre-programmed as a local label that is bound to a specific—RSVP Traffic Engineering (TE) interface at the device;
receiving, at the device, a request for the interface binding label via a RECORD ROUTE object of a Resource Reservation Protocol (RSVP) PATH message;
providing, by the device, the interface binding label towards a head-end node of a path in the network by recording the interface binding label in a RECORD ROUTE object (RRO) of an RSVP RESV message, wherein the RSVP RESV message is received at the head-end node and records the interface binding label in the RRO to create a label stack for a new label switch path;
receiving, at the device, a packet that includes the interface binding label; and
forwarding, by the device, the packet via the traffic engineering interface of the device.

7. The method as in claim 6, wherein the packet comprises a label stack that indicates a segment routing adjacency segment, and wherein the device forwards the packet via the segment routing adjacency segment.

8. An apparatus, comprising:
one or more network interfaces to communicate with a network;
a processor coupled to the one or more network interfaces and configured to execute one or more processes; and
a memory configured to store a process executable by the processor, the process when executed configured to:
determine that traffic sent via a first label switched path should be sent via a new label switched path;
send a request for the interface binding label for each node in the new label switched path via a RECORD ROUTE object of a Resource Reservation Protocol (RSVP) PATH message;
receive an interface binding label for each node in the new label switched path via a Resource Reservation Protocol (RSVP) RESV message, wherein the interface binding label for each node in the new label switched path is recorded in a RECORD ROUTE object (RRO) of the RSVP RESV message to create a label stack for the new label switch path;
send the traffic along the new label switched path using a label stack that indicates one or more preprogrammed interface binding labels, wherein the one or more interface binding labels are local labels that are each bound to a specific RSVP-Traffic Engineering (TE) interface of one or more corresponding nodes along the new label switched path, and a particular node along the new label switched path is configured to forward the traffic via a particular TE interface of the node based on a corresponding interface binding label; and
complete a switchover from the first path to the new label switched path.

9. The apparatus as in claim 8, wherein the process when executed is further configured to:
request the one or more interface binding labels for traffic engineering interfaces of the nodes via a RSVP PATH message.

10. The apparatus as in claim 9, wherein the apparatus receives data indicative of the one or more interface binding labels for the traffic engineering interfaces of the nodes via an RSVP RESV message.

11. The apparatus as in claim 8, wherein the apparatus sends the traffic along the new label switched path using the label corresponding to the new label switched path after expiration of a timer configured to afford the nodes time to install the path label.

12. The apparatus as in claim 8, wherein the process when executed is further operable to:
receive data indicative of the one or more interface binding labels for traffic engineering interfaces of nodes along the new label switched path.

13. An apparatus, comprising:
one or more network interfaces to communicate with a network;
a processor coupled to the one or more network interfaces and configured to execute one or more processes; and
a memory configured to store a process executable by the processor, the process when executed configured to:
determine an interface binding label for a traffic engineering interface of the apparatus, wherein the interface binding label is pre-programmed as a local label that is bound to a specific—RSVP Traffic Engineering (TE) interface at the apparatus;
receive a request for the interface binding label via a RECORD ROUTE object of Resource Reservation Protocol (RSVP) PATH message;
provide an interface binding label towards a head-end node of a path in the network by recording the interface binding label in a RECORD ROUTE object (RRO) of an RSVP RESV message, wherein the RSVP RESV message is received at the head-end node and records the interface binding label in the RRO to create a label stack for a new label switch path;
receive a packet that includes the interface binding label; and
forward the packet via the traffic engineering interface of the apparatus.

14. The apparatus as in claim 13, wherein the packet comprises a label stack that indicates a segment routing adjacency segment, and wherein the apparatus forwards the packet via the segment routing adjacency segment.

* * * * *